United States Patent [19]

Wakasa et al.

[11] Patent Number: 4,856,472
[45] Date of Patent: Aug. 15, 1989

[54] CYLINDER HEAD WITH CERAMIC PRECOMBUSTION CHAMBER

[75] Inventors: Akinori Wakasa, Hiroshima; Minoru Machida; Yasuhiro Miyakawa, both of Nagoya; Seiichi Asami, Okazaki, all of Japan

[73] Assignee: NGK Insulators, Ltd., Nagoya, Japan

[21] Appl. No.: 199,160

[22] Filed: May 26, 1988

[30] Foreign Application Priority Data

Jun. 2, 1987 [JP] Japan ............... 62-85541[U]

[51] Int. Cl.$^4$ ............................................. F02B 19/16
[52] U.S. Cl. ...................................... 123/270; 123/271
[58] Field of Search ................ 123/270, 271, 273, 254

[56] References Cited

U.S. PATENT DOCUMENTS 2,106,124  1/1938  Ricardo ............................. 123/273
4,616,611  10/1986  Ogawa et al. ..................... 123/270

FOREIGN PATENT DOCUMENTS 62-10418  1/1987  Japan ................................ 123/270

Primary Examiner—Andrew M. Dolinar
Attorney, Agent, or Firm—Arnold, White & Durkee

[57] ABSTRACT

A cylinder head has a ceramic precombustion chamber for an internal combustion engine. The cylinder head includes a part of the cylinder head made of a ceramic body having an injection aperture communicating with a main combustion chamber for jetting burning gases therethrough, a metal sleeve fitted on an outer circumference of the ceramic body and fitted in a precombustion chamber insert bore forming part of the cylinder head, and a head gasket interposed between the cylinder block forming the main combustion chamber and the ceramic body, the metal sleeve and the cylinder head. A surface of the ceramic body facing to the head gasket extends onto a side of the main combustion chamber beyond a surface of the ceramic body opening the injection aperture into the main combustion chamber.

3 Claims, 2 Drawing Sheets

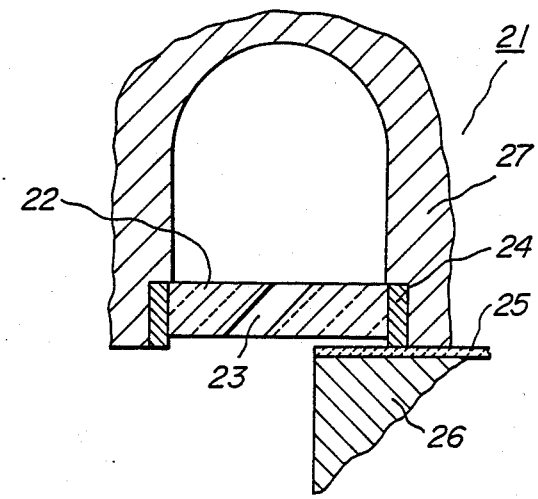
FIG_1
PRIOR ART
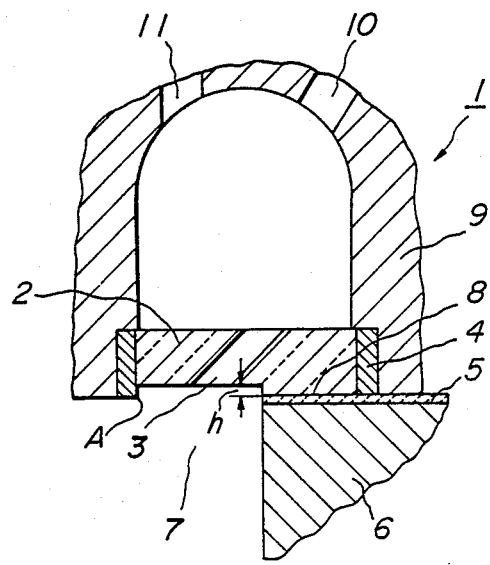
FIG_2

FIG._3a
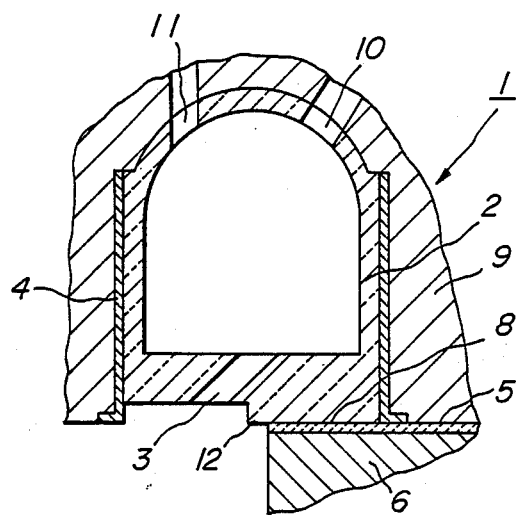
FIG._3b
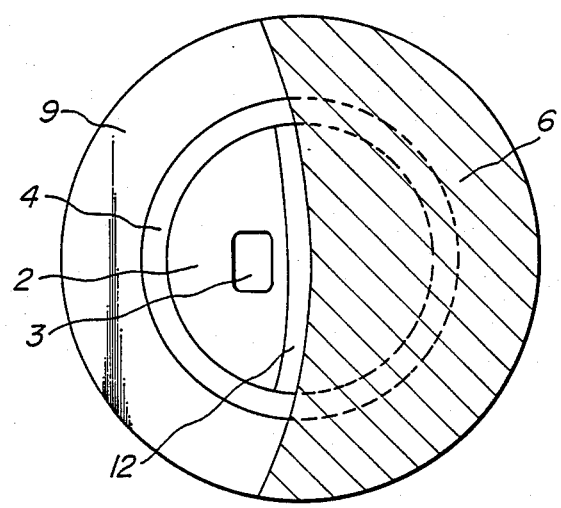

CYLINDER HEAD WITH CERAMIC PRECOMBUSTION CHAMBER

BACKGROUND OF THE INVENTION

This invention relates to a cylinder head with a ceramic precombustion chamber for an internal combustion engine such as a diesel engine or the like.

Cylinder heads provided with ceramic precombustion chambers have been practically used for diesel engines in view of their excellent heat resistance and heat transfer coefficient. Such a cylinder head was disclosed in Japanese Patent Application Publication No. 61-42,096 as shown in FIG. 1. With the cylinder head 21 shown in FIG. 1, after a metal sleeve 24 is fitted on an outer circumference of a ceramic precombustion chamber 22 having an injection aperture so as to extend some way from an end surface of the precombustion chamber 22 on a side of a main combustion chamber, the metal sleeve 24 together with the ceramic precombustion chamber 22 is press-fitted into a cylinder head 27 and the extending portion of the metal sleeve is then cut away by machining.

With the cylinder head 21 with the ceramic precombustion chamber obtained as above described, however, even if only the extending portion of the metal sleeve 24 is cut off, it is very difficult to make the cut surface of the metal sleeve 24 flush with the surface of the precombustion chamber on the side of the main combustion chamber. As a result, when the cylinder head 21 with the ceramic precombustion chamber is mounted through a gasket 25 onto a cylinder block 26, a clearance would occur between the head gasket 25 and the surface of the ceramic precombustion chamber 22 on the side of the main combustion chamber so that the head gasket is exposed to burning gases to deteriorate in use. As a result, burned gases leak out of the main combustion chamber.

SUMMARY OF THE INVENTION

It is a primary object of the invention to provide an improved cylinder head with a ceramic precombustion chamber for an internal combustion engine, which eliminates all the disadvantages of the prior art.

In order to achieve this object, a cylinder head with a ceramic precombustion chamber for an internal combustion engine according to the invention comprises a part of the cylinder head made of a ceramic body having an injection aperture communicating with a main combustion chamber for jetting burning gases therethrough, a metal sleeve fitted on an outer circumference of said ceramic body and fitted in a precombustion chamber insert bore forming part of the cylinder head, and a head gasket interposed between the cylinder block forming the main combustion chamber and the ceramic body, the metal sleeve and the cylinder head, a surface of the ceramic body facing to the head gasket extending onto a side of the main combustion chamber beyond a surface of the ceramic body opening said injection aperture into the main combustion chamber.

According to the invention, surfaces of the cylinder head with the precombustion chamber abutting against a gasket are flush with one another, so that the head gasket is not exposed to combustion gases and is not deteriorated by the gases in use. All that is required is to grind only the surface of the ceramic precombustion chamber abutting against the gasket on the side of the main combustion chamber so that time required for grinding can be shortened.

In order that the invention may be more clearly understood, preferred embodiments will be described, by way of example, with reference to the accompanying drawings.

BRIEF DESCRIPTION OF THE DRAWINGS

FIG. 1 is a sectional view of a cylinder head with a precombustion chamber of the prior art;

FIG. 2 is a sectional view illustrating one embodiment of a cylinder head with a ceramic precombustion chamber; and FIGS. 3a and 3b are a sectional and a bottom plan view of another embodiment of a cylinder head with a ceramic precombustion chamber according to the invention.

DESCRIPTION OF THE PREFERRED EMBODIMENTS

A cylinder head 1 with a ceramic precombustion chamber shown in FIG. 1 consists of a ceramic precombustion chamber 2 and a metal cylinder head 9. The ceramic precombustion chamber 2 is in opposition to a main combustion chamber 7 and has an injection aperture 3 through which burned gases flow into the main combustion chamber 7.

A surface 8 of the ceramic precombustion chamber 2 abutting against a head gasket 5 extends from an injection aperture opening surface of the ceramic precombustion chamber 2 facing to the main combustion chamber 7. A height h of the extending surface 8 is of the order of 0.1-0.5 mm which should be selected depending upon ceramic precombustion chamber producing methods and on the basis of shapes which do not disturb the burning gases. The reason why the height h is within the range of 0.1-0.5 mm is as follows. As a portion shown by A in FIG. 2 is likely to be damaged by jetting flames, it is preferable to make the extending height h as small as possible. Moreover, a smaller extending height h is preferable in view of propagation of the jetting flames. On the other hand, if it is intended to make the height h less than 0.1 mm, the surface of the ceramic precombustion chamber facing the main combustion chamber may be cut due to dimensional errors of the ceramic precombustion chamber, a metal sleeve and the cylinder head in manufacturing and assembling, so that cutting time and tool life are detrimentally affected.

A metal sleeve 4 is fitted on an outer circumference of the ceramic precombustion chamber 2 by a thermal shrinkage-fit or press-fit. A surface of the metal sleeve 4 abutting against the head gasket 5 is flush with the surface 8 of the ceramic precombustion chamber 2 abutting against the head gasket 5.

The ceramic precombustion chamber 2 and the metal sleeve 4 are press-fitted in the metal cylinder head 9. The metal cylinder head 9 is formed in its upper portion with an injection nozzle insert aperture 10 and a glow plug insert aperture 11. A surface of the metal cylinder head 9 abutting against the head gasket 5 is flush with the surface 8 of the ceramic precombustion chamber 2 and the lower surface of the metal sleeve 4.

The cylinder head 1 with the ceramic precombustion chamber constructed as above described is mounted on a cylinder block 6.

In order that the surfaces of the ceramic precombustion chamber 2, the metal sleeve 4 and the metal cylinder head 9 abutting against the gasket 5 are flush with one another, after the ceramic precombustion chamber has been mounted in the metal sleeve 4 and the metal cylinder head 9 to form a unitary body, the surfaces of these members are ground into flush surfaces.

FIGS. 3a and 3b illustrate another cylinder head 1 with a ceramic precombustion chamber according to another embodiment of the invention in a sectional and a bottom plan view, respectively. With this embodiment, the precombustion chamber 2 consists of a ceramic chamber only which is formed in its upper portion with an injection nozzle insert aperture 10 and a glow plug insert aperture 11 and in its lower portion with an injection aperture. The ceramic precombustion chamber 2 has a surface 8 abutting against a gasket 5. Part of the surface of a projection 12 of the ceramic precombustion chamber 2 contacts the gasket 5. This feature is different from that of the embodiment shown in FIG. 2.

It is preferable to make a precombustion chamber of a ceramic material, because the heat generated in combustion is prevented from leaking or dissipating out of the chamber so that the temperatures in the inside of the precombustion chamber rapidly rise with the result being that an engine is easily started and at the same time and smoke can be prevented.

The ceramic precombustion chamber 2 may be formed as a unitary structure as shown in FIG. 2 or may be divided into upper and lower portions.

As can be seen from the above explanation, with the cylinder head with the ceramic precombustion chamber according to the invention, a head gasket is not exposed to combustion gases and is not deteriorated by the gases in use. All that is required is to grind only the surface of the ceramic precombustion chamber abutting against a gasket on a side of a main combustion chamber so that time required for grinding can be shortened.

It is further understood by those skilled in the art that the foregoing description is that of preferred embodiments of the disclosed cylinder head and that various changes and modifications may be made in the invention without departing from the spirit and scope thereof.

What is claimed is:

1. A cylinder head with a ceramic precombustion chamber for an internal combustion engine, comprising:
   a precombustion chamber insert bore formed in a portion of said cylinder head;
   a metal sleeve fitted in said precombustion chamber insert bore; and
   a ceramic member fitted in said metal sleeve, said ceramic member having an injection aperture formed therethrough and including a surface adjacent to a main combustion chamber of said internal combustion engine, said surface having a first surface portion in direct communication with said main combustion chamber and a second surface portion isolated from said main combustion chamber by a head gasket and cylinder block of said internal combustion engine, a boundary of said first surface portion of adjoining said metal sleeve being axially inwardly spaced from an end of said metal sleeve adjacent said main combustion chamber, and said second surface portion being axially aligned with said end and in direct contact with said head gasket.

2. A cylinder head according to claim 1, wherein said first surface portion is axially inwardly spaced about 0.1–0.5 mm.

3. A cylinder head according to claim 1, wherein said ceramic body forms the precombustion chamber.

* * * * *